US012438804B2

(12) United States Patent
Tao et al.

(10) Patent No.: US 12,438,804 B2
(45) Date of Patent: Oct. 7, 2025

(54) METHOD, APPARATUS, MEDIUM AND ELECTRONIC DEVICE FOR NETWORK ACCESS

(71) Applicant: Beijing Youzhuju Network Technology Co., Ltd., Beijing (CN)

(72) Inventors: Yiyuan Tao, Beijing (CN); Haidong Gao, Beijing (CN); Kai Zhang, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/744,502

(22) Filed: Jun. 14, 2024

(65) Prior Publication Data
US 2024/0340233 A1     Oct. 10, 2024

Related U.S. Application Data

(63) Continuation of application No. PCT/CN2022/134354, filed on Nov. 25, 2022.

(30) Foreign Application Priority Data
Dec. 16, 2021   (CN) .......................... 202111544129.5

(51) Int. Cl.
*H04L 45/121*   (2022.01)
*H04L 45/28*    (2022.01)
(52) U.S. Cl.
CPC ............ *H04L 45/121* (2013.01); *H04L 45/28* (2013.01)
(58) Field of Classification Search
CPC .............................. H04L 45/121; H04L 45/28
See application file for complete search history.

(56) References Cited

U.S. PATENT DOCUMENTS

2010/0250656 A1* 9/2010 Kisel ................. H04N 21/6338
                                                        709/203
2012/0192213 A1* 7/2012 Ashley ................. H04L 45/123
                                                        725/1
(Continued)

FOREIGN PATENT DOCUMENTS

CN           1859213 A     11/2006
CN         104735088 A      6/2015
(Continued)

OTHER PUBLICATIONS

International Patent Application No. PCT/CN2022/134354; Int'l Search Report; dated Feb. 24, 2023; 3 pages.
(Continued)

Primary Examiner — Yaotang Wang
(74) Attorney, Agent, or Firm — BakerHostetler

(57) ABSTRACT

The present disclosure relates to a method, apparatus, medium and electronic device for network access, applied to a Content Delivery Network, comprising: determining a candidate node currently accessible to a client in response to that a predetermined routing condition is triggered; obtaining response time consumption corresponding to the candidate nodes by measuring the rates of the candidate nodes, and determining an optimal node among the candidate nodes based on the response time consumption, a smaller response time consumption representing a faster network response rate corresponding to a candidate node; and accessing the client to the optimal node for network communication.

20 Claims, 6 Drawing Sheets

(56) References Cited

U.S. PATENT DOCUMENTS

2015/0012656 A1    1/2015  Phillips et al.
2016/0226708 A1*   8/2016  Maheshwari ........... H04L 67/10

FOREIGN PATENT DOCUMENTS

| CN | 107979638 A | 5/2018 |
| CN | 108076117 A | 5/2018 |
| CN | 110933136 A | 3/2020 |
| CN | 113144622 A | 7/2021 |
| CN | 113422728 A | 9/2021 |
| CN | 114205296 A | 3/2022 |
| WO | WO 2017/080172 A1 | 5/2017 |
| WO | WO 2018/033205 A1 | 2/2018 |

OTHER PUBLICATIONS

China Patent Application No. 202111544129.5; Office Action; dated Oct. 30, 2023; 10 pages (contains English Translation).
China Patent Application No. 202111544129.5; Second Office Action; dated May 30, 2024; 10 pages (contains English Translation).

* cited by examiner

METHOD, APPARATUS, MEDIUM AND ELECTRONIC DEVICE FOR NETWORK ACCESS

CROSS-REFERENCE TO RELATED APPLICATIONS

This application is a continuation of International Patent Application No. PCT/CN2022/134354, filed on Nov. 25, 2022, which claims priority to Chinese Application No. 202111544129.5 entitled "method, apparatus, medium and electronic device for network access" filed on Dec. 16, 2021, the disclosures of which are incorporated herein by reference in their entities.

FIELD

The present disclosure relates to the network technical field and, in particular, to a method, apparatus, medium and electronic device for network access

BACKGROUND

CDN (Content Delivery Network) can schedule user requests to the nearest service node in real time based on network traffic and information of each node such as the connection, load, distance to the user and response time, thereby increasing the response rate of the user access to a certain domain name website. The CDN node (edge server node) currently accessed by the user cannot be selected by the client, nor can the client actively judge the network quality of the CDN node, including connection time and success rate. That is, the server has full authority over the scheduling of user requests. Moreover, in the event of CDN node failure, the problem has to be solved relying on the alarm mechanism on the CDN side and the method of configuring Domain Name System (DNS) resolution. The stop loss takes a long time to take effect, and the client service is usually subject to greater loss.

SUMMARY

This Summary is provided to introduce concepts in a simplified form that are further described below in the Detailed Description. This Summary is not intended to identify key features or essential features of the technical solution as defined, nor is it intended to be used to limit the scope thereof.

In a first aspect, the present disclosure provides a method for network access, applied to a content delivery network, the method comprising: determining candidate nodes currently accessible to a client in response to that a predetermined routing condition is triggered; obtaining response time consumption corresponding to the candidate nodes by measuring rates of the candidate nodes, and determining an optimal node among the candidate nodes based on the response time consumption, a smaller response time consumption representing a faster network response rate corresponding to a candidate node; and accessing the client to the optimal node for network communication.

In a second aspect, the present disclosure provides an apparatus for network access, applied to a content delivery network, the apparatus comprising: a first determining module configured for determining candidate nodes currently accessible to a client in response to that a predetermined routing condition is triggered; a second determining module configured for obtaining response time consumption corresponding to the candidate nodes by measuring rates of the candidate nodes, and determining an optimal node among the candidate nodes based on the response time consumption, a smaller response time consumption representing a faster network response rate corresponding to a candidate node; and a network access module configured for accessing the client to the optimal node for network communication.

In a third aspect, the present disclosure provides a computer-readable medium having a computer program stored thereon, the program, when executed by a processing unit, implementing the steps of the method described in the first aspect.

In a fourth aspect, the present disclosure provides an electronic device, comprising: a storage unit storing at least one computer program thereon; and at least one processing unit for executing the at least one computer program in the storage unit to implement the steps of the method described in one aspect.

Other features and advantages of the present disclosure will be explained in detail in the DETAILED DESCRIPTION section below.

BRIEF DESCRIPTION OF THE DRAWINGS

The above and other features, advantages and aspects of the implementations of the present disclosure will become more apparent in combination with the accompanying drawings and with reference to the following detailed description. In the drawings, the same or similar reference symbols refer to the same or similar elements, where.

DETAILED DESCRIPTION

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in the implementations of the present disclosure may be performed in a different order and/or in parallel. In addition, the implementations may comprise an additional step and/or omit a step which is shown. The scope of the present disclosure is not limited in this regard.

The term "comprise" and its variants used herein are to be read as open terms that mean "include, but is not limited to." The term "based on" is to be read as "based at least in part on." The term "one embodiment" is to be read as "at least one embodiment." The term "another embodiment" is to be read as "at least one other embodiment." The term "some embodiments" is to be read as "at least some embodiments."

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

Names of messages or information interacted between a plurality of apparatuses in the implementations of the present disclosure are merely for the illustration purpose, rather than limiting the scope of these messages or information.

Figure 1:
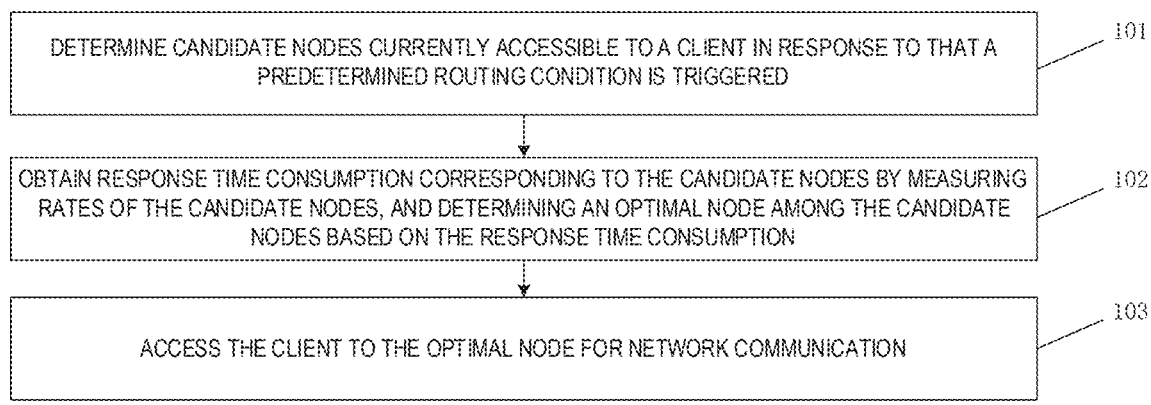
FIG. 1 is a flowchart of a method for network access according to an example embodiment of the present disclosure.

FIG. 1 is a flowchart of a method for network access according to an example embodiment of the present disclosure. The method is applied to a Content Delivery Network. As shown in FIG. 1, the method comprises steps 101 to 103.

In step 101, candidate nodes currently accessible to a client are determined in response to that a predetermined routing condition is triggered.

The predetermined routing condition can be any one or more of a variety of conditions, such as a cold start of the client, reaching the client's routing time interval, network switching of the client, etc. When the predetermined routing condition is triggered, it means that the client currently needs to reselect a CDN node to access and then reconnect. When the client is cold started, that is, when the client is restarted by the user after having ended the process, the node to which the client wants to access is re-determined instead of directly accessing the default node or the node accessed when the client ends the background process, which can avoid the problem of poor network status of the node accessed by the client caused by changes in the network status corresponding to each node while the client is not started. By reselecting the node to be accessed by the client when the client routing interval is reached, such a problem can be avoided that the client's access node is no longer the optimal node due to changes in the network status where it takes a long time to implement the client's startup, thus affecting users' optimal network experience at the client. When a network switch occurs on the client, by re-determining the node that the client wants to access, the problem can be avoided such that the client's access node is no longer the optimal node due to changes in the network status corresponding to the node in the event of the network switch. The network switch can be switching from a mobile data network to a WIFI network, or switching between different WIFI networks, etc.

Determining the candidate nodes currently accessible to the client can be based on a service that the client needs to request. The same service can correspond to a plurality of nodes, and different nodes correspond to different service routes. In addition, when determining the candidate node, the fault status of each node corresponding to the service can also be determined, and then only the node that has not failed is used as a currently accessible candidate node.

In step 102, response time consumption corresponding to the candidate node is obtained by measuring the rate of the candidate node, and an optimal node among the candidate nodes is determined based on the response time consumption. The smaller the response time consumption, the faster the response rate of the network corresponding to the candidate node.

In step 103, the client accesses the optimal node for network communication.

The response time of the candidate node can be determined based on the Time To First Byte (TTFB) of a rate test request, that is, the response time from sending data from the client to receiving the first byte from the server (i.e. node) is used as the response time consumption, excluding the time required to establish the connection between the client and the server. Therefore, the interference of connection reuse and server processing time on the response time consumption for the rate test request can be eliminated, thereby ensuring that the rate test results are fair.

By determining the response time consumption, the response rate of each node to the client's request can be obtained, thereby characterizing the node that is better for the client's service request to a certain extent. When determining the optimal node based on the response time consumption, the node with the smallest response time can be determined as the most optimal node to ensure the response rate when the client requests the service.

With the above technical solution, in the Content Delivery Network, the optimal node for the client to access and request services is determined based on the response time consumption obtained by the client actively. Then the client can actively measure the rate of each service node. Thus, the client's active selection of access to the service node can be realized, which ensures the response efficiency when the client requests services and further ensures the user experience of the client.

Figure 2:
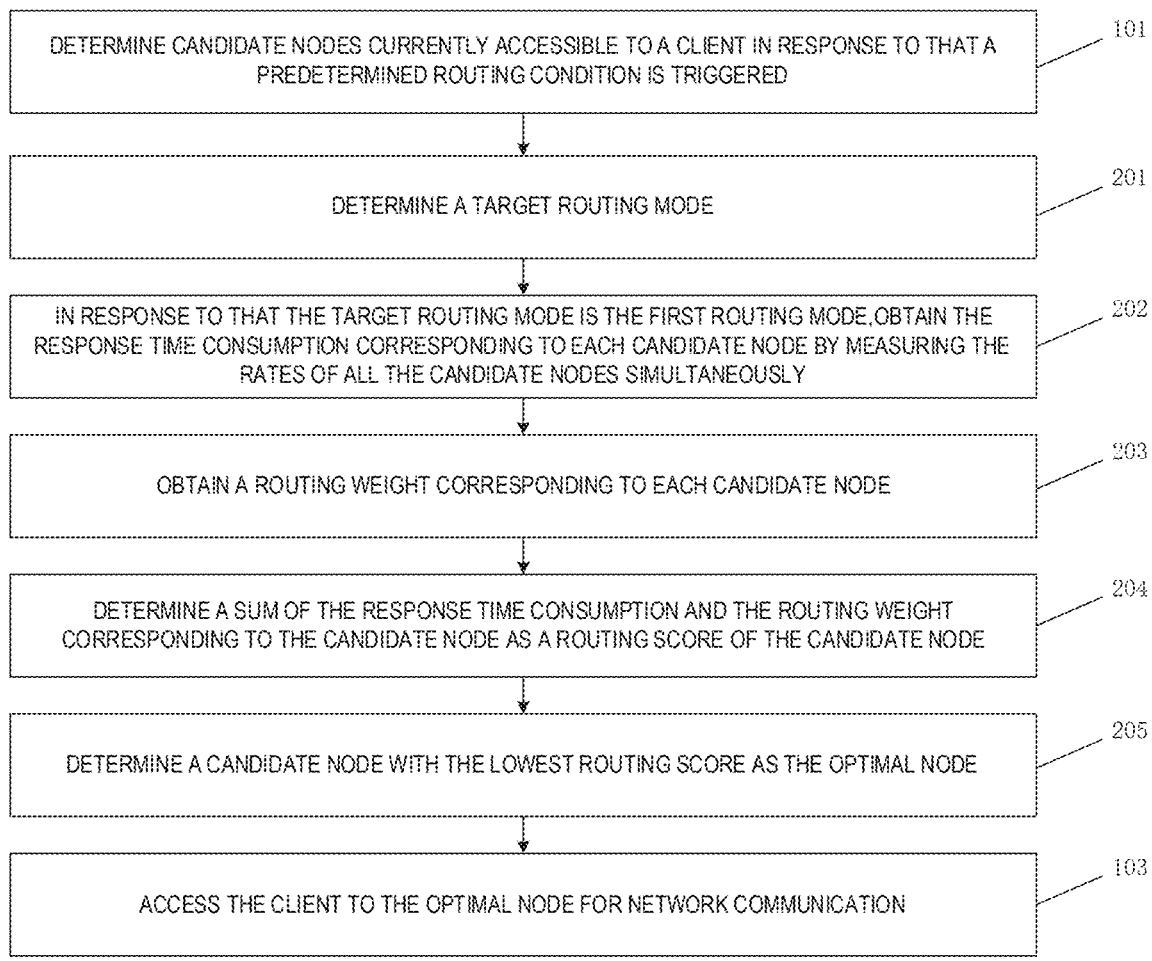
FIG. 2 is a flowchart of a method for network access according to another example embodiment of the present disclosure.

FIG. 2 is a flowchart of a method for network access according to another example embodiment of the present disclosure. As shown in FIG. 2, the method further comprises steps 201 to 205.

In step 201, a target routing mode is determined, where the target routing mode comprises a first routing mode and a second routing mode. The target routing mode can be a variety of predetermined routing modes. For example, it can be a routing mode with priority on traffic saving, a routing mode with priority on network experience, or a routing mode with priority on other network parameters. In the present disclosure, it is not intended to limit the type of the target routing mode. Only two examples of the first routing mode and the second routing mode are shown in this embodiment.

In some implementations, the target routing mode can further be determined by obtaining the user's selection instruction for the routing mode and based on the selection instruction. Different routing modes can be used to prompt the user to make a selection based on an emphasis parameter of the routing mode. For example, the aforementioned routing mode with priority on traffic saving and the routing mode with priority on network rate can use "traffic saving priority" and "rate priority" as a prompt word respectively for the user to select the target routing mode based on their own needs.

In this embodiment, the first routing mode can be a routing mode with priority on network experience, i.e., priority on network rate.

In step 202, in the event that the target routing mode is the first routing mode, the response time consumption corresponding to each candidate node is obtained by measuring the rate of all the candidate nodes. The method for determining the response time consumption can also be determined based on the Time To First Byte (TTFB) of the rate test request to eliminate the interference of connection reuse and server-side processing time on the response time consumption of the rate test request and ensure fairness of the rate measurement.

In step 203, a routing weight corresponding to each candidate node is obtained, the routing weight characterizing a priority corresponding to the candidate node. The smaller the routing weight, the higher the priority corresponding to the candidate node. The priority characterized by the routing weight can be comprehensively determined in advance based on various parameters such as the manufacturer of each node, historical network status, bandwidth and the like. In the absence of other reference factors, the one with the highest priority will be preferentially selected as the optimal node.

In step 204, a sum of the response time consumption and the routing weight corresponding to the candidate node is determined as a routing score of the candidate node. The lower the routing score, the better the network experience corresponding to the selected node.

In step 205, a candidate node with the lowest routing score is determined as the optimal node.

Since the first routing mode is a routing mode with priority on network experience, it is necessary to judge the network experience of all candidate nodes, that is, to measure the response time consumption of all candidate nodes. The solution of measuring the rate of all the candidate nodes at the same time shown in step 202 is just an example, that is, the rate measurement of the response time consumption of the candidate node may be performed at the same time or not at the same time. In the present disclosure, the timing of starting the rate measurement is not limited, as long as the response time consumption can be measured in time to calculate the routing score of each candidate node, so as to determine the optimal node.

In some implementations, in the event that the target routing mode is the first routing mode, when determining the optimal node, reference can be made to only parameters that can characterize the network experience, that is, the response time consumption, without considering other network factors and the predetermined routing weight, so long as it can be ensured that the optimal node can respond to the client's service as quickly as possible. However, a single influence factor can easily lead to errors in the rate measurement result of the node on the client, and the determined optimal node cannot provide the client with the fastest network service. Therefore, the optimal node can be determined jointly through the response time consumption and the predetermined routing weight, which can further ensure the quality of network services provided by the optimal node to the client.

Figure 3:
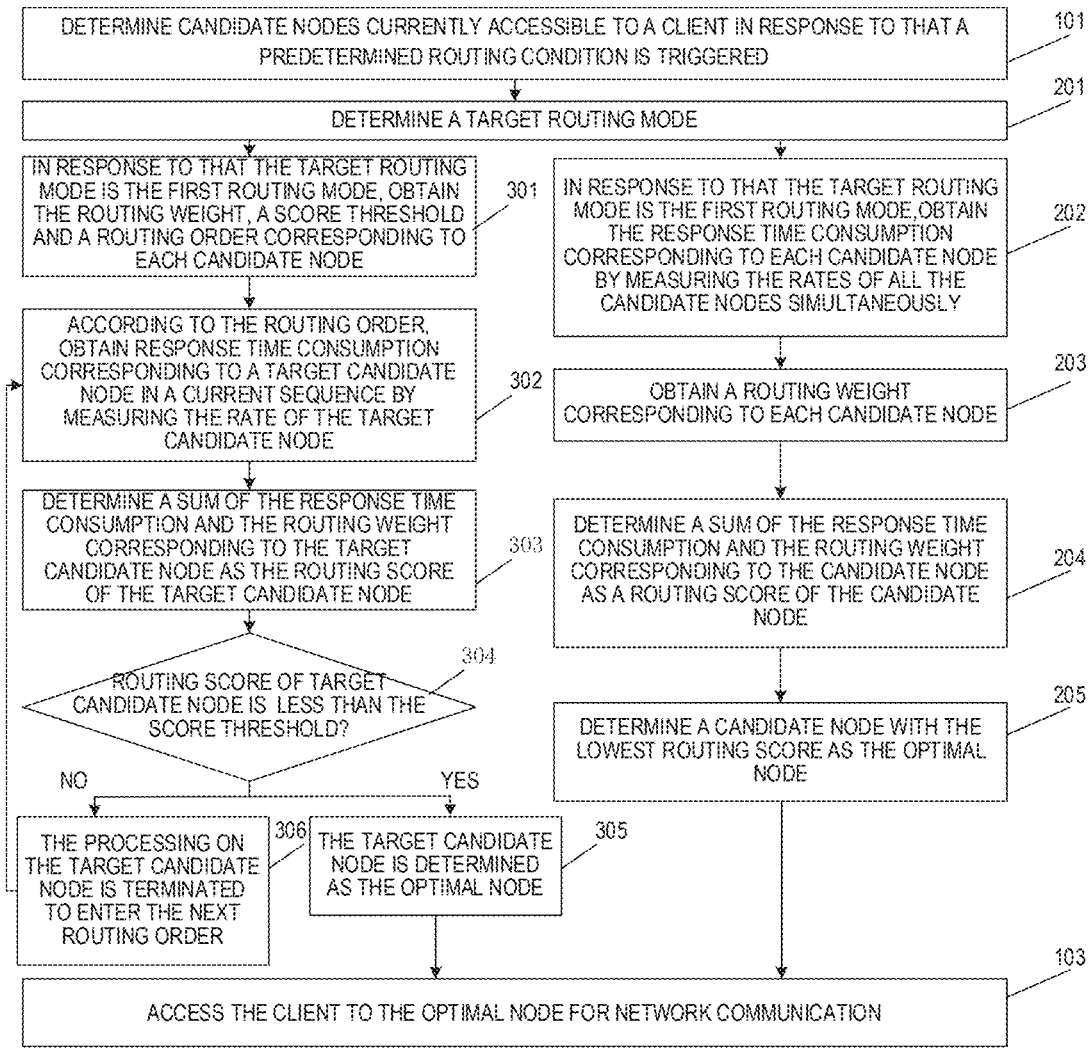
FIG. 3 is a flowchart of a method for network access according to yet another example embodiment of the present disclosure.

FIG. 3 is a flowchart of a method for network access according to yet another example embodiment of the present disclosure. As shown in FIG. 3, the method further comprises steps 301 to 306.

In step 301, in response to that the target routing mode is the second routing mode, the routing weight, a score threshold and a routing order corresponding to each candidate node are obtained.

The second routing mode can be a traffic-saving priority routing mode, that is, a node with a smaller network traffic overhead that can provide the same service is selected preferentially as the optimal node.

The routing order characterizes a network bandwidth overhead corresponding to the candidate node. The lower the network bandwidth overhead, the higher the routing order of the candidate node. The network bandwidth overhead can be determined by manufacturers corresponding to different nodes and thus can be determined in advance.

The routing weight may, as mentioned above, characterize the priority corresponding to the candidate node. The smaller the routing weight, the higher the priority corresponding to the candidate node. The routing weight can be obtained comprehensively based on various parameters such as each node's manufacturer, historical network status, bandwidth and the like and then set in advance.

The score threshold, like the routing weight, can be comprehensively determined in advance based on various parameters such as each node's manufacturer, historical network status, bandwidth and the like. The score threshold corresponding to each candidate node can be different depending on the actual situation. However, in the event that the sum of the response time consumption and the routing weight of each candidate node is equal to the corresponding score threshold, the network traffic overhead required by each candidate node for the same service request should be close. If, during routing, the routing determined based on the response time consumption obtained from the actual rate measurement of each candidate node and the routing weight is not less than the score threshold, it can be determined that the network traffic overhead of the candidate node is quite large or the service response rate is slow, and thus the candidate node is not suitable as the optimal node.

In the second routing mode, a node with smaller network traffic overhead needs to be selected as the optimal node among a plurality of candidate nodes, and the routing order characterizing the network bandwidth overhead corresponding to the candidate node can be obtained in advance. Therefore, when judging each candidate node, the judgment can be made sequentially based on the routing order. In each round of sequence, the optimal node is determined based on the relationship between the routing score of the target candidate node and the score threshold corresponding to the target candidate node. If the candidate node that is higher in the order meets the condition for determining the optimal node, then the candidate node in the higher order can be directly determined as the optimal node, without the need to continue to judge the candidate node in the lower order, thereby improving the routing efficiency.

Specifically, the process for determining the optimal node based on the relationship between the routing score of the target candidate node and the score threshold corresponding to the target candidate node according to the routing order may be as shown in steps 302 306 below.

In step 302, according to the routing order, response time consumption corresponding to the target candidate node is obtained by measuring the rate of the target candidate node in the current sequence. The target candidate node is also the candidate node in the current routing order. The rate measurement method can be the same as described above.

In step 303, a sum of the response time consumption and the routing weight corresponding to the target candidate node is determined as the routing score of the target candidate node.

In step 304, judgment is made as to whether the routing score of the target candidate node is less than the score threshold corresponding to the target candidate node. If yes, the flow goes to step 305, and if not, goes to step 306.

In step 305, the target candidate node is determined as the optimal node.

In step 306, the processing on the target candidate node is ended, and the flow enters the next routing order and returns to step 302.

After the optimal node is determined, no matter whether all the candidate nodes determined in step 101 have been processed, the process for determining the optimal node will be directly ended, and the flow directly goes to step 103 to connect the client to the optimal node for network communication.

Figure 4:
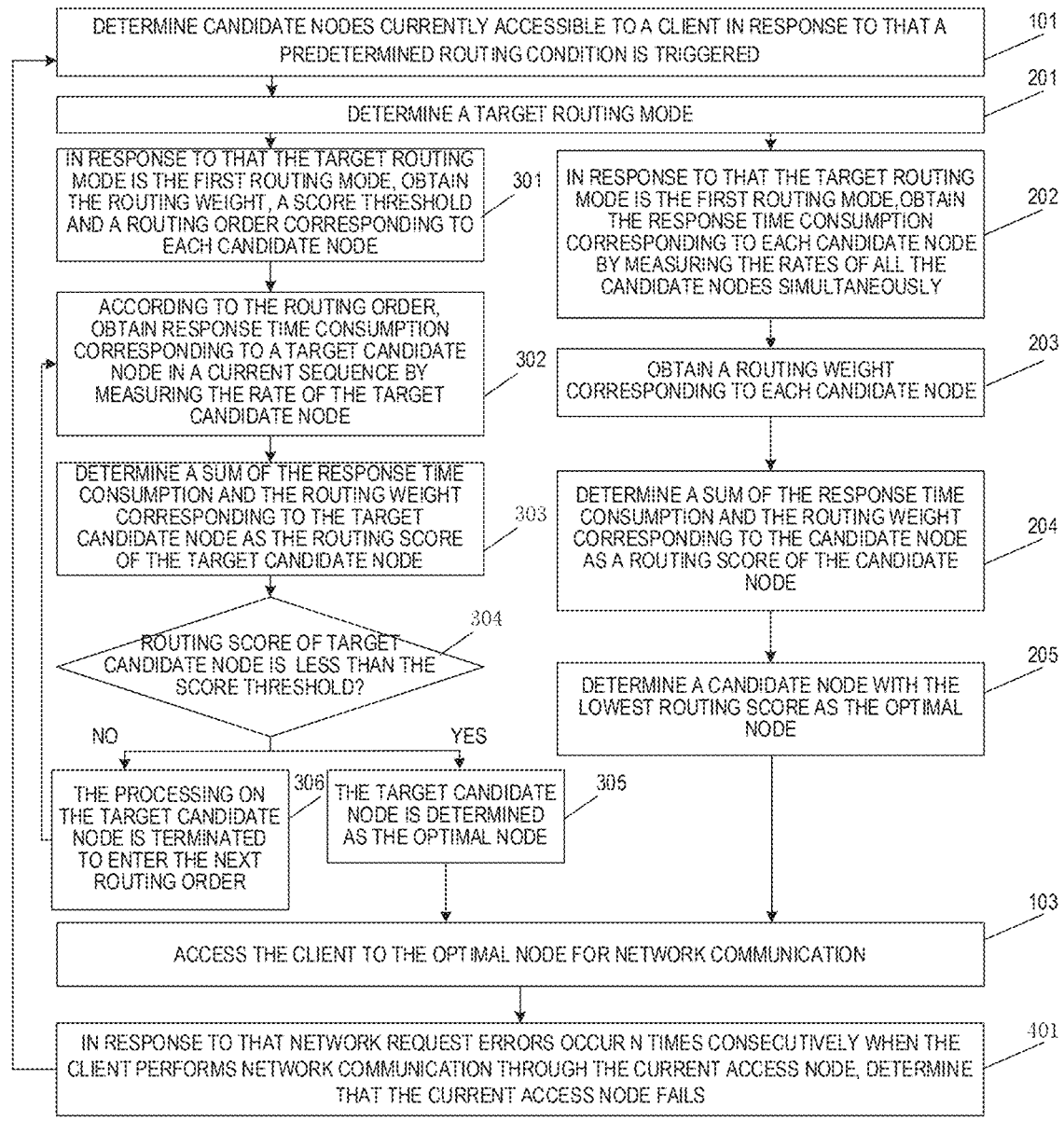
FIG. 4 is a flowchart of a method for network access according to yet another example embodiment of the present disclosure.

FIG. 4 is a flowchart of a method for network access according to yet another example embodiment of the present disclosure. As shown in FIG. 4, the method further comprises step 401.

In step 401, in response to that network request errors occur N times consecutively when the client performs network communication through the current access node, it is determined that the current access node fails, where N is a positive integer greater than 0.

The predetermined routing condition comprises: that the current access node of the client fails.

With the above technical solution, after the client determines the optimal node and connects to the network, fault sensing on the current access node can further be performed, and the fault status of the current access node can be determined in a timely and proactive manner. In addition, where it is determined that the current access node fails, rerouting of each candidate node can be triggered, so that after the current access node fails, it is possible to switch to other optimal node that meets the target routing mode in a timely and proactive manner, so as to avoid the impact of node failure on users and achieve certain disaster recovery effects.

Figure 5:
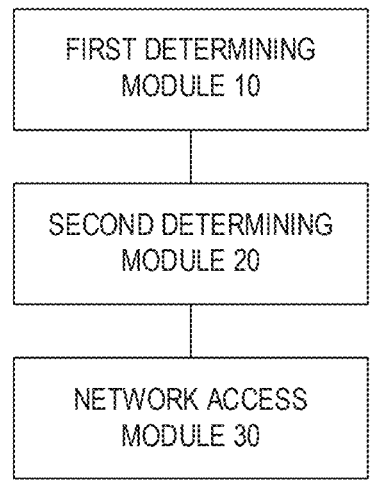
FIG. 5 is a structural block diagram of an apparatus for network access according to an example embodiment of the present disclosure.

FIG. 5 is a structural block diagram of an apparatus for network access according to an example embodiment of the present disclosure. The apparatus for network access is applied to a Content Delivery Network. As shown in FIG. 5, the apparatus comprises: a first determining module 10, configured for determining a candidate node currently accessible to a client when a predetermined routing condition is triggered; a second determining module 20 configured for obtaining response time consumption corresponding to the candidate node by measuring the rate of the candidate node, and for determining an optimal node among the candidate nodes based on the response time consumption, where the smaller the response time consumption, the faster the network response rate corresponding to the candidate node; and a network access module 30 configured for accessing the client to the optimal node for network communication.

With the above technical solution, in the Content Delivery Network, the optimal node for the client to access and request services is determined based on the response time consumption obtained by the client actively. Then the client can actively measure the rate of each service node. Thus, the client's active selection of access to the service node can be realized, which ensures the response efficiency when the client requests services and further ensures the user experience of the client.

Figure 6:
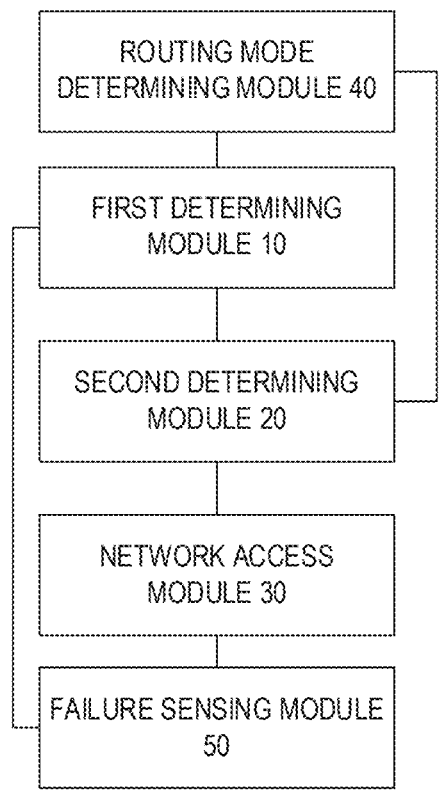
FIG. 6 is a structural block diagram of an apparatus for network access according to yet another example embodiment of the present disclosure.

FIG. 6 is a structural block diagram of an apparatus for network access according to an example embodiment of the present disclosure. As shown in FIG. 6, the apparatus further comprises a routing mode determining module 40 configured for determining a target routing mode, where the target routing mode comprises a first routing mode and a second routing mode. In the event that the target routing mode is the first routing mode, the second determining module 20 is further configured for: obtaining the response time consumption corresponding to each candidate node by measuring the rate of all the candidate nodes at the same time; obtaining a routing weight corresponding to each candidate node, the routing weight characterizing a priority corresponding to the candidate node, the smaller the routing weight, the higher the priority corresponding to the candidate node; determining a sum of the response time consumption and the routing weight corresponding to the candidate node as a routing score of the candidate node, the lower the routing score, the better the network experience corresponding to the candidate node; and determining a candidate node with the lowest routing score as the optimal node.

In some implementations, in the event that the target routing mode is the second routing mode, the second determining module 20 is further configured for: obtaining the routing weight, a score threshold and a routing order corresponding to each candidate node; the routing order characterizing a network bandwidth overhead corresponding to the candidate node, the lower the network bandwidth overhead, the higher the routing order of the candidate node; and performing the following processing on each candidate node according to the routing order:

obtaining response time consumption corresponding to a target candidate node in a current sequence by meaning the rate of the target candidate node; determining a sum of the response time consumption and the routing weight corresponding to the target candidate node as the routing score of the target candidate node; determining the optimal node based on a relationship between a routing score of the target candidate node and the score threshold corresponding to the target candidate node; where if it is determined that the routing score of the target candidate node is not less than the score threshold corresponding to the target candidate node, the processing on the target candidate node is ended to enter the next routing order; if it is determined that the routing score of the target candidate node is less than the score threshold corresponding to the target candidate node, the target candidate node is determined as the optimal node.

In some implementations, the predetermined routing condition comprises: that a current access node of the client fails. As shown in FIG. 6, the apparatus further comprises a failure sensing module 50 configured for, in the event that network request errors occur N times consecutively when the client performs network communication through a current access node, determining that the current access node fails, N being a positive integer greater than 0.

In some implementations, the predetermined routing condition further comprises at least one of: the client being cold-started; the client's routing time interval being reached; and the client undergoing a network switch.

In some implementations, the first determining module 10 is further configured for determining a node that has not failed among predetermined nodes corresponding to the client as the currently accessible candidate node.

In some implementations, the routing mode determining module 40 is further configured for: obtaining a selection instruction of a user for a routing mode, and determining the target routing mode based on the selection instruction.

With the above technical solution, in the Content Delivery Network, the optimal node for the client to access and request services is determined based on the response time consumption obtained by the client actively. Then the client can actively measure the rate of each service node. Thus, the client's active selection of access to the service node can be realized, which ensures the response efficiency when the client requests services and further ensures the user experience of the client.

Figure 7:
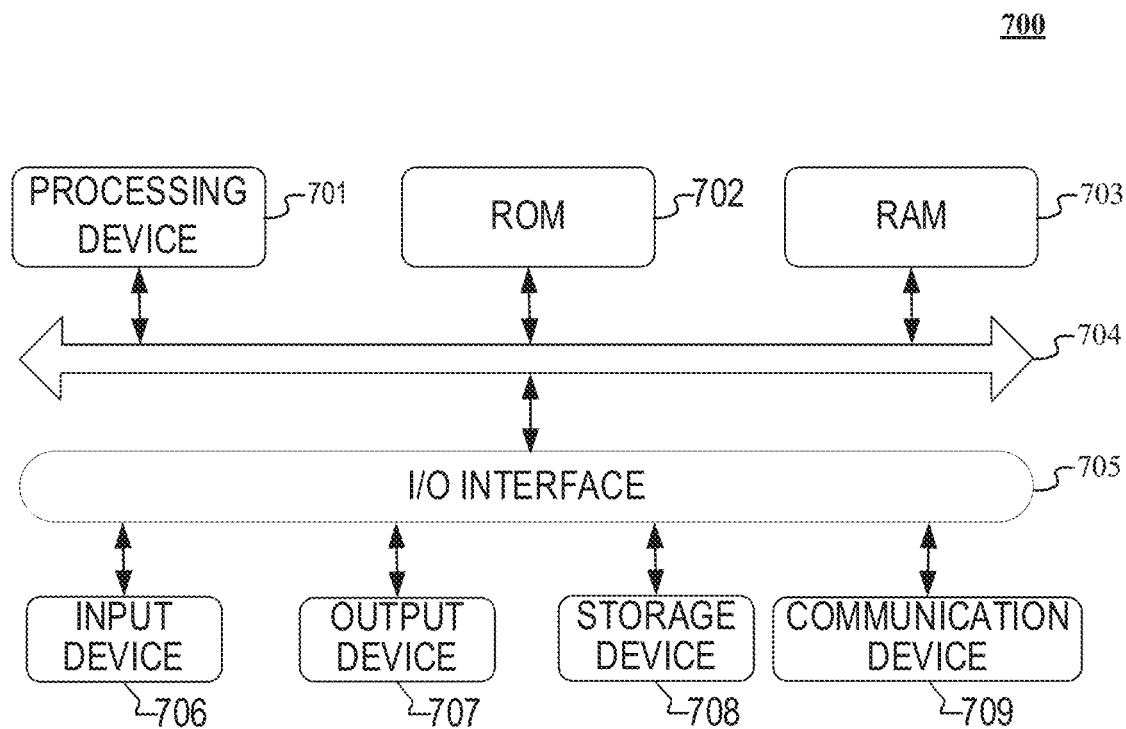
FIG. 7 shows a schematic structural diagram of an electronic device that is suitable for implementing the embodiments of the present disclosure.

Referring to FIG. 7, which is a schematic structural diagram of an electronic device 700 suitable for implementing the embodiments of the present disclosure. The electronic device in the embodiments of the present disclosure may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device shown in FIG. 7 is merely an example and should not impose any restrictions on the functions and scope of use of the embodiments of the present application.

As shown in FIG. 7, the electronic device 700 may include a processing device (such as a central processing unit and a graphics processor) 701, which may execute various appropriate actions and processing according to a program stored in a read-only memory (ROM) 702 or a program loaded to a random access memory (RAM) 703 from a storage device 708. Various programs and data required during operation of the electronic device 700 are also stored in the RAM 703. The processing device 701, the ROM 702 and the RAM 703 are connected with one another via a bus 704. An input/output (I/O) interface 705 is also connected to the bus 704.

Generally, the following apparatuses may be connected to the I/O interface 705: an input device 706 including for example a touch screen, a touch pad, a keyboard, a mouse, a camera, a microphone, an accelerometer and a gyroscope; an output device 707 including for example a liquid crystal display (LCD), a speaker and a vibrator; a storage device 708 including for example a magnetic tape and a hard disk; and a communication device 709. The communication device 709 may allow wireless or wired communication between the electronic device 700 and other devices for data exchange. Although FIG. 7 shows the electronic device 700 having various devices, it should be understood that not all the devices shown are necessarily required to be implemented or provided. More or fewer devices may alternatively be implemented or provided.

In particular, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 709, or installed from the storage device 708, or installed from the ROM 702. The computer program, when executed by the processing unit 701, causes the processing unit to execute the above functions defined in the methods according to the embodiments of the present disclosure.

It should be noted that the computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementations, a client and server may communicate using any currently known or future developed network protocol such as HTTP (HyperText Transfer Protocol) and may interconnect with any form or medium of digital data communication (such as communication networks). Examples of communication networks include Local Area Networks (LANs), Wide Area Networks (WANs), the Internet (such as the Internet), and end-to-end networks (such as ad hoc end-to-end networks), as well as any network currently known or future developed.

The computer-readable medium may be included in the electronic device described above; or it may stand alone without being assembled into the electronic device.

The computer-readable medium carries one or more programs. When the one or more programs are executed by the electronic device, the electronic device performs the method of fur rendering.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method, and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or can be implemented by the combination of dedicated hardware and computer instructions.

The units involved in the embodiments described in this application may be implemented in software or hardware. Herein, the name of the unit/module does not constitute a limitation on the unit itself in some cases. For example, a voice data collection module may further be described as "a data collection module".

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more embodiments of the present disclosure, example 1 provides a method for network access, applied to a content delivery network, wherein the method comprises: determining candidate nodes currently accessible to a client in response to that a predetermined routing condition is triggered; obtaining response time consumption corresponding to the candidate nodes by measuring rates of the candidate nodes, and determining an optimal node among the candidate nodes based on the response time consumption, a smaller response time consumption representing a faster network response rate corresponding to a candidate node; and accessing the client to the optimal node for network communication.

According to one or more embodiments of the present disclosure, example 2 provides a method according to example 1, the method further comprising: determining a target routing mode, the target routing mode comprising a first routing mode and a second routing mode; in response to that the target routing mode is the first routing mode, the obtaining response time consumption corresponding to the candidate nodes by measuring rates of the candidate nodes, and determining an optimal node among the candidate nodes based on the response time consumption comprises: obtaining the response time consumption corresponding to each candidate node by measuring the rates of all the candidate nodes simultaneously; obtaining a routing weight corresponding to each candidate node, the routing weight characterizing a priority corresponding to the candidate node, a smaller routing weight representing a higher priority corresponding to the candidate node; determining a sum of the response time consumption and the routing weight corresponding to the candidate node as a routing score of the candidate node, a lower routing score representing a better network experience corresponding to the candidate node; and determining a candidate node with the lowest routing score as the optimal node.

According to one or more embodiments of the present disclosure, example 3 provides a method according to example 2, wherein in response to that the target routing mode is the first routing mode, the obtaining response time consumption corresponding to the candidate nodes by measuring the rates of the candidate nodes and determining an optimal node among the candidate nodes based on the response time consumption further comprises: obtaining the routing weight, a score threshold and a routing order corresponding to each candidate node; the routing order characterizing a network bandwidth overhead corresponding to the candidate node, a lower network bandwidth overhead representing a higher routing order of the candidate node; and performing the following processing on each candidate node sequentially according to the routing order: obtaining response time consumption corresponding to a target candidate node in a current sequence by measuring the rate of the target candidate node; determining a sum of the response time consumption and the routing weight corresponding to the target candidate node as the routing score of the target candidate node; determining the optimal node based on a relationship between the routing score of the target candidate node and the score threshold corresponding to the target candidate node; wherein in accordance with a determination that the routing score of the target candidate node is not less than the score threshold corresponding to the target candidate node, the processing on the target candidate node is terminated to enter the next routing order; in accordance with a determination that the routing score of the target candidate node is less than the score threshold corresponding to the target candidate node, the target candidate node is determined as the optimal node.

According to one or more embodiments of the present disclosure, example 4 provides a method according to example 1, wherein the predetermined routing condition comprises: that a current access node of the client fails; the method further comprises: in response to that network request errors occur N times consecutively when the client performs network communication through the current access node, determining that the current access node fails, N being a positive integer greater than 0.

According to one or more embodiments of the present disclosure, example 5 provides a method according to example 4, wherein the predetermined routing condition further comprises at least one of: the client being cold-started; a routing time interval for the client being reached; the client undergoing a network switch.

According to one or more embodiments of the present disclosure, example 6 provides a method according to example 4, wherein the determining a candidate node currently accessible to a client comprises: determining a node without a failure among predetermined nodes corresponding to the client as the currently accessible candidate node.

According to one or more embodiments of the present disclosure, example 7 provides a method according to example 1, further comprising: obtaining a selection instruction for a routing mode from a user, and determining the target routing mode based on the selection instruction.

According to one or more embodiments of the present disclosure, example 8 provides an apparatus for network access, applied to a content delivery network, wherein the apparatus comprises: a first determining module configured for determining candidate nodes currently accessible to a client in response to that a predetermined routing condition is triggered; a second determining module configured for obtaining response time consumption corresponding to the candidate nodes by measuring rates of the candidate nodes, and determining an optimal node among the candidate nodes based on the response time consumption, a smaller response time consumption representing a faster network response rate corresponding to a candidate node; and a network access module configured for accessing the client to the optimal node for network communication.

According to one or more embodiments of the present disclosure, example 9 provides a computer-readable medium, having a computer program stored thereon, wherein the program, when executed by a processing unit, implements the steps of the method according to any of examples 1 to 7.

According to one or more embodiments of the present disclosure, example 10 provides an electronic device, comprising: a storage unit storing at least one computer program thereon; and at least one processing unit for executing the at least one computer program in the storage unit to implement the steps of the method according to any of examples 1 to 7.

The above description is only for the preferred embodiments disclosed in this disclosure and an explanation of the technical principles used. Those skilled in this field should understand that the scope of disclosure referred to in this disclosure is not limited to technical solutions formed by specific combinations of the aforementioned technical features, and should also cover other technical solutions formed by arbitrary combinations of the aforementioned technical features or their equivalent features without departing from the disclosed concept. For example, a technical solution formed by replacing the above features with (but not limited to) technical features with similar functions disclosed in this disclosure.

Furthermore, although the operations are depicted in a specific order, this should not be understood as requiring them to be executed in the specific order shown or in sequential order. In certain environments, multitasking and parallel processing may be advantageous. Similarly, although several specific implementation details are included in the above discussion, these should not be interpreted as limitations on the scope of this disclosure. Some features described in the context of individual embodiments can also be combined to be implemented in a single embodiment. On the contrary, various features described in the context of a single embodiment can also be implemented separately or in any suitable sub combination in multiple embodiments.

Although the subject matter has been described in language specific to structural features and/or method logical actions, it should be understood that the subject matter limited in the attached claims may not necessarily be limited to the specific features or actions described above. On the contrary, the specific features and actions described above are only exemplary forms of implementing the claims. Regarding the device in the above embodiments, the specific ways in which each module performs operations have been described in detail in the relevant embodiments of the method, and will not be elaborated here.

What is claimed is:

1. A method for network access, applied to a content delivery network, wherein the method comprises:
   determining candidate nodes currently accessible to a client in response to that a predetermined routing condition is triggered;
   determining response time consumption corresponding to the candidate nodes by determining a response time indicative of a duration from sending data from the client to receiving a first byte by the client from each of the candidate nodes;
   measuring network response rates of the candidate nodes, and determining an optimal node among the candidate nodes based on the response time consumption and the network response rates, wherein a smaller response time corresponds to a faster network response rate; and
   connecting the client to the optimal node for network communication;
   wherein in response to a target routing mode being a first routing mode, the determining the optimal node among the candidate nodes comprises:
   measuring the network response rates of all the candidate nodes simultaneously,
   obtaining a routing weight corresponding to each candidate node, the routing weight characterizing a priority corresponding to the candidate node, wherein a smaller routing weight represents a higher priority corresponding to the candidate node,
   determining a sum of the response time consumption and the routing weight corresponding to the candidate node as a routing score of the candidate node, wherein a lower routing score represents a better network experience corresponding to the candidate node, and
   determining a candidate node with the lowest routing score as the optimal node.

2. The method according to claim 1, wherein the method further comprises: determining the target routing mode, the target routing mode comprising the first routing mode and a second routing mode.

3. The method according to claim 2, wherein in response to that the target routing mode is the second routing mode, the determining an optimal node among the candidate nodes further comprises:
   obtaining the routing weight, a score threshold and a routing order corresponding to each candidate node, wherein the routing order characterizes a network bandwidth overhead corresponding to the candidate node, and a lower network bandwidth overhead represents a higher routing order of the candidate node; and performing the following processing on each candidate node sequentially according to the routing order:
obtaining response time consumption corresponding to a target candidate node in a current sequence by measuring the rate of the target candidate node;
determining a sum of the response time consumption and the routing weight corresponding to the target candidate node as the routing score of the target candidate node;
determining the optimal node based on a relationship between the routing score of the target candidate node and the score threshold corresponding to the target candidate node;
wherein in accordance with a determination that the routing score of the target candidate node is not less than the score threshold corresponding to the target candidate node, the processing on the target candidate node is terminated to enter the next routing order; in accordance with a determination that the routing score of the target candidate node is less than the score threshold corresponding to the target candidate node, the target candidate node is determined as the optimal node.

4. The method according to claim 2, further comprising:
obtaining a selection instruction for a routing mode from a user, and determining the target routing mode based on the selection instruction.

5. The method according to claim 1, wherein the predetermined routing condition comprises: that a current access node of the client fails;
the method further comprises:
in response to that network request errors occur N times consecutively when the client performs network communication through the current access node, determining that the current access node fails, N being a positive integer greater than 0.

6. The method according to claim 5, wherein the predetermined routing condition further comprises at least one of:
the client being cold-started;
a routing time interval for the client being reached;
the client undergoing a network switch.

7. The method according to claim 5, wherein the determining a candidate node currently accessible to a client comprises:
determining a node without a failure among predetermined nodes corresponding to the client as the currently accessible candidate node.

8. A non-transitory computer-readable medium, having a computer program stored thereon, wherein the program, when executed by a processing unit, implements operations, wherein the operations comprise:
determining candidate nodes currently accessible to a client in response to that a predetermined routing condition is triggered;
determining response time consumption corresponding to the candidate nodes by determining a response time indicative of a duration from sending data from the client to receiving a first byte by the client from each of the candidate nodes;
measuring network response rates of the candidate nodes, and determining an optimal node among the candidate nodes based on the response time consumption and the network response rates, wherein a smaller response time corresponds to a faster network response rate; and
connecting the client to the optimal node for network communication;

wherein in response to a target routing mode being a first routing mode, the determining the optimal node among the candidate nodes comprises:
measuring the network response rates of all the candidate nodes simultaneously,
obtaining a routing weight corresponding to each candidate node, the routing weight characterizing a priority corresponding to the candidate node, wherein a smaller routing weight represents a higher priority corresponding to the candidate node,
determining a sum of the response time consumption and the routing weight corresponding to the candidate node as a routing score of the candidate node, wherein a lower routing score represents a better network experience corresponding to the candidate node, and
determining a candidate node with the lowest routing score as the optimal node.

9. The non-transitory computer-readable medium according to claim 8, wherein the operations further comprise:
determining the target routing mode, the target routing mode comprising the first routing mode and a second routing mode.

10. The non-transitory computer-readable medium according to claim 9, wherein in response to that the target routing mode is the second routing mode, the determining an optimal node among the candidate nodes further comprises:
obtaining the routing weight, a score threshold and a routing order corresponding to each candidate node, wherein the routing order characterizes a network bandwidth overhead corresponding to the candidate node, and a lower network bandwidth overhead represents a higher routing order of the candidate node; and
performing the following processing on each candidate node sequentially according to the routing order:
obtaining response time consumption corresponding to a target candidate node in a current sequence by measuring the rate of the target candidate node;
determining a sum of the response time consumption and the routing weight corresponding to the target candidate node as the routing score of the target candidate node;
determining the optimal node based on a relationship between the routing score of the target candidate node and the score threshold corresponding to the target candidate node;
wherein in accordance with a determination that the routing score of the target candidate node is not less than the score threshold corresponding to the target candidate node, the processing on the target candidate node is terminated to enter the next routing order; in accordance with a determination that the routing score of the target candidate node is less than the score threshold corresponding to the target candidate node, the target candidate node is determined as the optimal node.

11. The non-transitory computer-readable medium according to claim 9, the operations further comprising:
obtaining a selection instruction for a routing mode from a user, and determining the target routing mode based on the selection instruction.

12. The non-transitory computer-readable medium according to claim 8, wherein the predetermined routing condition comprises: that a current access node of the client fails;
the operations further comprise:
in response to that network request errors occur N times consecutively when the client performs network communication through the current access node, determining that the current access node fails, N being a positive integer greater than 0.

13. The non-transitory computer-readable medium according to claim 12, wherein the predetermined routing condition further comprises at least one of:
the client being cold-started;
a routing time interval for the client being reached;
the client undergoing a network switch.

14. The non-transitory computer-readable medium according to claim 12, wherein the determining a candidate node currently accessible to a client comprises:
determining a node without a failure among predetermined nodes corresponding to the client as the currently accessible candidate node.

15. An electronic device, comprising:
a storage device storing at least one computer program thereon; and
at least one processing device for executing the at least one computer program in the storage device to implement operations, wherein the operations comprise:
determining response time consumption corresponding to the candidate nodes by determining a response time indicative of a duration from sending data from the client to receiving a first byte by the client from each of the candidate nodes;
measuring network response rates of the candidate nodes, and determining an optimal node among the candidate nodes based on the response time consumption and the network response rates, wherein a smaller response time corresponds to a faster network response rate; and
connecting the client to the optimal node for network communication;
wherein in response to a target routing mode being a first routing mode, the determining the optimal node among the candidate nodes comprises:
measuring the network response rates of all the candidate nodes simultaneously,
obtaining a routing weight corresponding to each candidate node, the routing weight characterizing a priority corresponding to the candidate node, wherein a smaller routing weight represents a higher priority corresponding to the candidate node,
determining a sum of the response time consumption and the routing weight corresponding to the candidate node as a routing score of the candidate node, wherein a lower routing score represents a better network experience corresponding to the candidate node, and
determining a candidate node with the lowest routing score as the optimal node.

16. The electronic device according to claim 15, wherein the operations further comprise: determining the target routing mode, the target routing mode comprising the first routing mode and a second routing mode.

17. The electronic device according to claim 16, wherein in response to that the target routing mode is the second routing mode, the determining an optimal node among the candidate nodes further comprises:
obtaining the routing weight, a score threshold and a routing order corresponding to each candidate node, wherein the routing order characterizes a network bandwidth overhead corresponding to the candidate node, and a lower network bandwidth overhead represents a higher routing order of the candidate node; and
performing the following processing on each candidate node sequentially according to the routing order:
obtaining response time consumption corresponding to a target candidate node in a current sequence by measuring the rate of the target candidate node;
determining a sum of the response time consumption and the routing weight corresponding to the target candidate node as the routing score of the target candidate node;
determining the optimal node based on a relationship between the routing score of the target candidate node and the score threshold corresponding to the target candidate node;
wherein in accordance with a determination that the routing score of the target candidate node is not less than the score threshold corresponding to the target candidate node, the processing on the target candidate node is terminated to enter the next routing order; in accordance with a determination that the routing score of the target candidate node is less than the score threshold corresponding to the target candidate node, the target candidate node is determined as the optimal node.

18. The electronic device according to claim 15, wherein the predetermined routing condition comprises: that a current access node of the client fails;
the operations further comprise:
in response to that network request errors occur N times consecutively when the client performs network communication through the current access node, determining that the current access node fails, N being a positive integer greater than 0.

19. The electronic device according to claim 18, wherein the predetermined routing condition further comprises at least one of:
the client being cold-started;
a routing time interval for the client being reached;
the client undergoing a network switch.

20. The electronic device according to claim 18, wherein the determining a candidate node currently accessible to a client comprises:
determining a node without a failure among predetermined nodes corresponding to the client as the currently accessible candidate node.

* * * * *